Feb. 14, 1961 R. C. WARD 2,972,104
MAGNETIC FIELD RESPONSIVE APPARATUS
Filed May 11, 1959 3 Sheets-Sheet 1
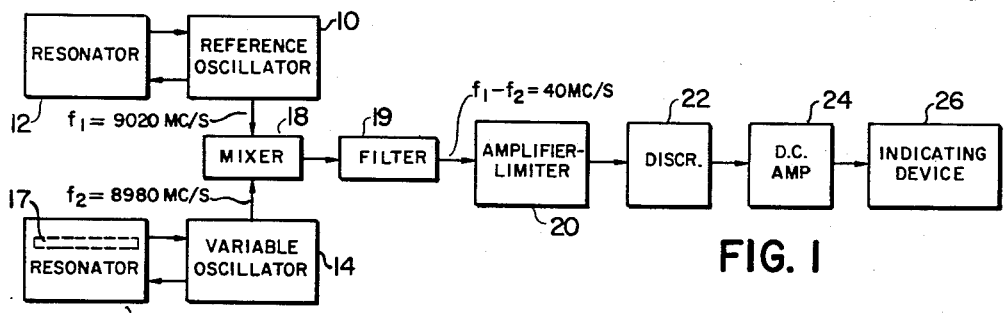
FIG. 1
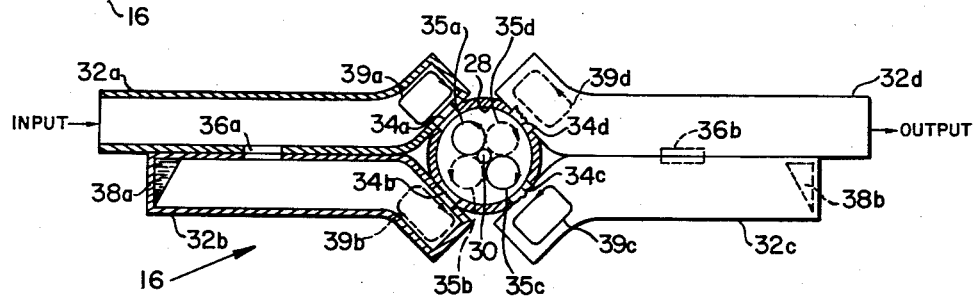
FIG. 4
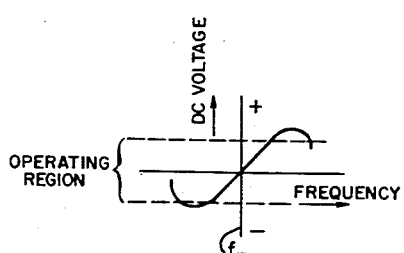
FIG. 2
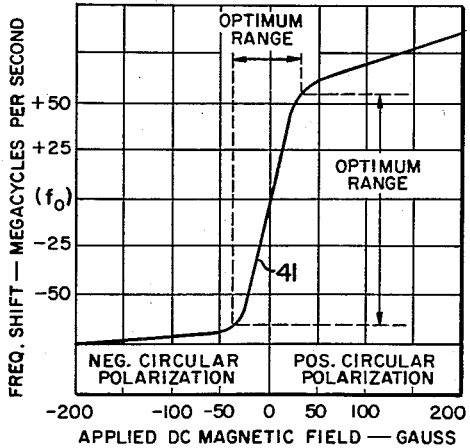
FIG. 5
FIG. 3
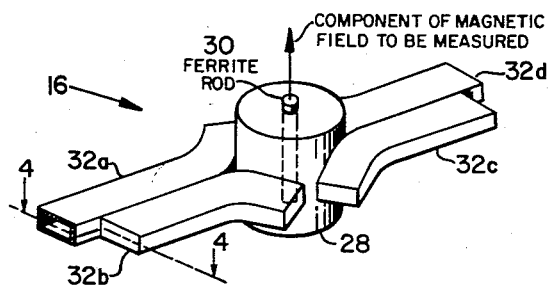
ROY C. WARD
INVENTOR
BY Jerry A. Dinardo
AGENT
Albert Rosen
ATTORNEY

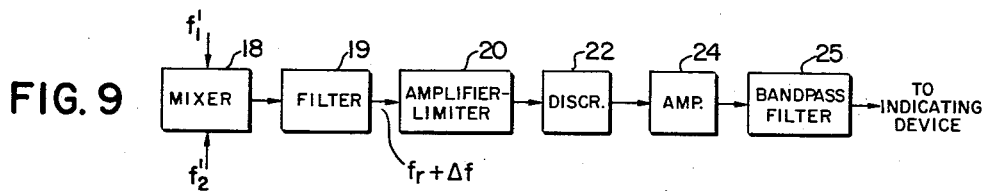
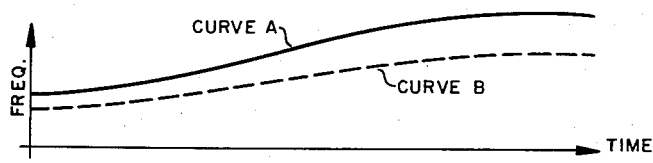
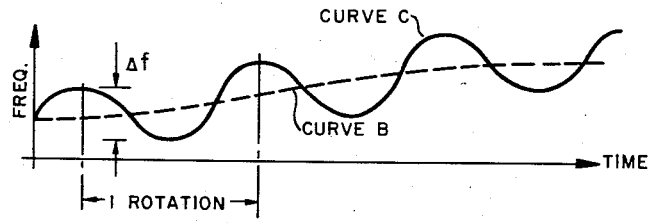
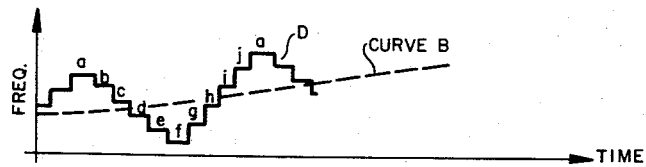
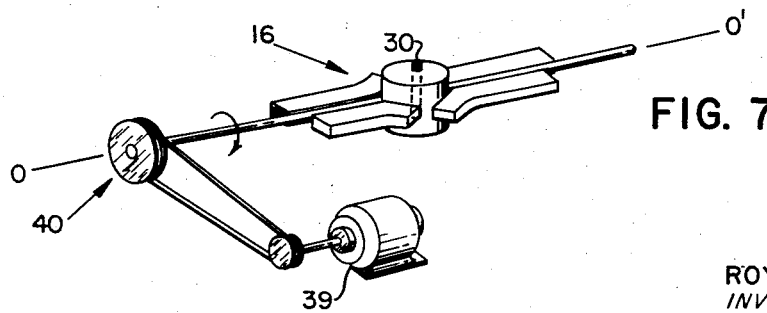

ROY C. WARD
INVENTOR
BY Jerry A. Dinardo
AGENT
Albert Rosen
ATTORNEY

United States Patent Office 2,972,104
Patented Feb. 14, 1961

2,972,104

MAGNETIC FIELD RESPONSIVE APPARATUS

Roy C. Ward, Rolling Hills, Calif., assignor to Space Technology Laboratories, Inc., Los Angeles, Calif., a corporation of California Filed May 11, 1959, Ser. No. 812,430

13 Claims. (Cl. 324—43)

This invention relates to the art of detecting and measuring magnetic fields, and proves especially advantageous in the measurement of relatively weak magnetic fields such as, for example, fields of appreciably less than one gauss in magnitude. While not limited thereto, the invention is herein described with reference to a magnetic field measuring apparatus.

While a number of different kinds of magnetic field detecting and measuring devices are known, they have not proven entirely satisfactory. For example, certain types of magnetometers or magnetic field measuring instruments are known which contain delicate parts, thereby rendering them unsuitable for applications where extreme conditions of vibration or other mechanical shock would substantially affect the reliability of the measurements. Furthermore, other types of magnetometers now in use consume substantial amounts of power, or are sensitive to small temperature changes, or are insensitive to relatively weak magnetic fields.

It is therefore an object of this invention to provide an improved magnetic field responsive means characterized by simplicity and ruggedness of construction, low bulk, weight, and power requirements, and relative insensitivity to environmental influences non-magnetic in nature.

A further object of this invention is to provide an improved means for providing accurate and reliable measurements of relatively weak magnetic fields in environments where the measuring means may be subjected to wide variations in temperature and/or to appreciable vibration or other mechanical shock.

Magnetic field measurement arrangements are known wherein use is made of ferromagnetic resonance phenomena to provide an indication of magnetic field magnitude. According to one such phenomenon the resonant frequency, of a cavity containing a ferromagnetic material of the kind that exhibits ferromagnetic resonance phenomena (say, for example, a ferrite element), changes in response to changes in magnetic field applied to the ferrite element. During the application of electromagnetic radiation to the cavity at a frequency at or near the region of ferromagnetic resonance of the ferrite element, wide variations in the resonant frequency of the cavity are realized in the presence of relatively small variations in magnetic field strength. According to the invention, in order to substantially eliminate the effects of frequency drift due to changes in environmental conditions other than changes in environmental magnetic field, the ferrite element is periodically oriented in opposite directions with respect to the direction of the magnetic field component to be measured. A measure of frequency change due to magnetic field, relatively unaffected by frequency drift of the apparatus, is provided by comparing the frequencies measured during a set of such opposite orientations. The difference between the frequencies measured during two successive opposite orientations is a measure of the environmental magnetic field, and is substantially independent of frequency drift of the apparatus.

In accordance with one embodiment of the invention two microwave signals of slightly different frequency are generated by the use of apparatus including two separate microwave signal generators, each generator being associated with a resonant cavity. The frequency of one of the signals is variable, while that of the other signal is maintained constant. The resonant cavity associated with the variable frequency signal contains, or is loaded with, a ferrite element having a predetermined axis of orientation. When this cavity is subjected to an external or environmental magnetic field along the axis of the ferrite element, a change is realized in the resonant frequency of that cavity, and thus also in the frequency of the signal associated with it. The other cavity is free of such ferrite elements, and the resonant frequency of this cavity is relatively insensitive to external magnetic fields. The two signals are compared or mixed together to produce a difference or heterodyne signal whose frequency varies with the magnitude of the magnetic field. The heterodyne signal may be applied to an appropriate signal utilization device where advantageous use can be made of the signal information representative of the environmental magnetic field. The two cavities used in this embodiment are rotated in unison so that the axis of the ferrite element of the variable frequency cavity rotates in a plane containing the magnetic field component to be measured. The changing orientation of the ferrite element causes the resonant frequency of its associated cavity resonator to be modulated sinusoidally at a frequency determined by the rate of rotation. A frequency deviation is thereby produced whose extent is a function of the magnitude of the component of the magnetic field in the plane of rotation of the element. The magnitude of this component of magnetic field is thereby inferred directly from the extent of the frequency excursion. If the rotation of the ferrite element is monitored so that its orientation or direction is known at any given instant of time, the magnitude of the magnetic field in the direction at that instant of time may be determined. This vector magnitude is determined by comparing the frequency output at that given instant of time with the frequency output at a succeeding instant of time when the ferrite element is oriented in a direction exactly opposite the first direction. The frequency difference is a measure of magnetic field magnitude and is substantially free of the effects of frequency drift in the apparatus.

In the drawings:

Fig. 1 is a block diagram showing generally one form of magnetometer apparatus used to measure a single component of an environmental magnetic field;

Fig. 2 is a graph depicting the characteristics of a discriminator circuit used in the apparatus of Fig. 1;

Fig. 3 is a partially schematic, perspective view of a portion of a ferrite mounted cavity resonator used in the apparatus of Fig. 1;

Fig. 4 is an enlarged sectional view taken along line 4—4 of Fig. 3;

Fig. 5 is a graph showing the frequency characteristics of the ferrite mounted cavity resonator of Figs. 3 and 4 as a function of magnetic field strength;

Fig. 6 is a graph depicting frequency drift of cavity resonators with time;

Fig. 7 is a diagrammatic view of one embodiment of the invention useful in overcoming the effects of frequency drift of cavity resonators;

Fig. 8 is a graph illustrating an aspect of the operation of the embodiment shown in Fig. 7;

Fig. 9 is a block diagram of a circuit useful in connection with the magnetometer apparatus of Fig. 7;

Fig. 10 is a graph illustrating an aspect of a modification of the embodiment shown in Fig. 7;

Figure 11:
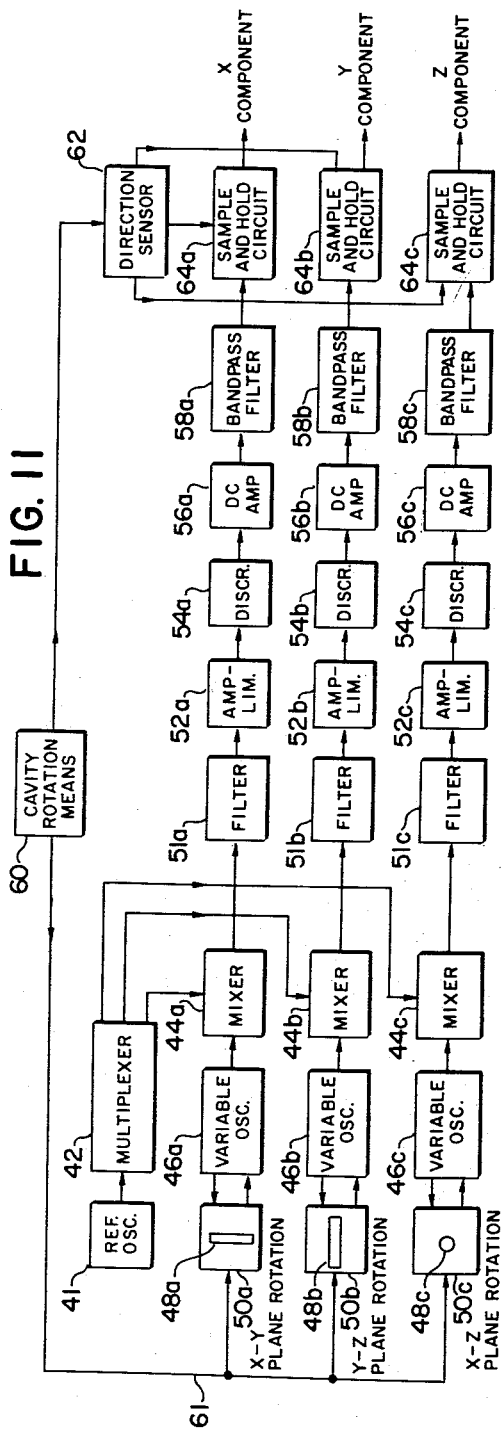
Fig. 11 is a block circuit diagram of magnetometer apparatus useful in measuring the field strengths of each of three mutually perpendicular components of an environmental magnetic field.

There is illustrated in Fig. 1 a block diagram of one form of magnetometer apparatus used to measure the magnetic field strength of one component of an environmental magnetic field. The magnetic field strength to be measured may be of the order of a fraction of one gauss in magnitude. For ease of explanation, the apparatus will first be described for the case where the cavity containing the ferrite is maintained fixed, rather than being mounted for rotation.

In this apparatus a first stable microwave oscillator 10, hereinafter called the first or reference oscillator, is arranged to generate a first microwave signal of constant frequency $f_1$, which by way of example can be a frequency of 9020 megacycles per second. The reference oscillator 10 may include in its tuning circuit a cavity resonator 12 of conventional design. The resonant frequency of the cavity resonator 12 is not substantially affected by external magnetic fields.

A second or variable microwave oscillator 14 is provided that is similar to the reference oscillator 10 except that this second oscillator includes, in its tuning circuit, a second cavity resonator 16 which contains an element or body 17 made of a ferromagnetic material of any of the known types (such as ferrites) that are capable of exhibiting ferromagnetic resonance phenomena. In such a material the apparent permeability of the material at microwave frequencies is affected, in the presence of a static magnetic field, in a manner such that the electron orbits of the atoms making up the material appear to precess in the presence of the magnetic field. If the microwave signal frequency to which the material is subjected substantially equals the precession frequency, resonance occurs. If such a ferromagnetic material is positioned within the influence of a resonant cavity, and the resonant frequency of the cavity is in the effective neighborhood of the ferromagnetic resonance frequency of the material, the material will act to change the effective resonant frequency of the cavity as a function of the strength of the magnetic field applied to the material. While different types of ferromagnetic materials may be used, for example both solids and plasmas prove useful, in practicing the invention ferromagnetic materials of the type known as ferrites may be advantageously used in view of their present easy availability. By ferrites there is meant materials that belong to the group of compounds of composition represented by the general chemical formula $MOFe_2O_3$, where M is a divalent metal ion such as Mn, Co, Ni, Cu, Mg, Zn, Cd, $Fe^{2+}$, or a mixture of these ions. These ferrites are cubical in crystal structure, and have a spinel structure similar to that exhibited by the mineral spinel ($MgAlO_4$). Ferrites may be imagined as derived from magnetite, $Fe_3O_4$, by replacing the ferrous ions of the magnetite by the divalent ions listed above. Among the ferrites that may be used are those described, for example, in "Ferromagnetism" by Richard M. Bozorth, published in 1956 by the D. Van Nostrand Company of Princeton, New Jersey, on pages 244 to 249.

As is known, a body 17 of such a material, say a ferrite body, acts to change the resonant frequency of the resonator 16 associated with it when the body is acted upon by an external magnetic field having a magnetic field component in a direction along the axis of the body. Hence, the frequency $f_2$ of the output signal of the second oscillator 14, unlike that of the reference oscillator 10, is not constant in frequency but is variable as a function of the strength of the magnetic field applied to the ferrite body. The second or variable frequency oscillator 14 is designed to produce an output signal that is normally (in the absence of any appreciable environmental magnetic field) slightly different in frequency from that of the first or reference oscillator 10. The frequency $f_2$ of this second signal may be of the order of 8980 megacycles per second, for example. The two signals $f_1$ and $f_2$, generated by the two oscillators 10 and 14, thus may normally differ by a frequency of approximately 40 megacycles per second.

The two signals from the oscillators 10 and 14 are heterodyned in a mixer circuit 18, which may be any one of the well-known microwave crystal mixer circuits, to produce a beat or difference frequency signal of frequency $f_1-f_2$. This difference frequency ($f_1-f_2$) is varied in accordance with the frequency variations produced in the output signal of the variable oscillator 14 by variations in magnitude of the magnetic field being measured. The output of the mixer circuit 18 is fed through a band-pass filter 19 to select this difference frequency. In this case the filter 19 is tuned to a band of frequencies centered at 40 megacycles per second, this band encompassing the range of expected variations in difference frequency between the signals from the two oscillators 10 and 14. If the range of magnetic field strength to be measured is of the order of 1 or 2 gauss in extent, a band with of about 4 megacycles per second is adequate for the filter 19. The filter 19 may, for example, be any conventional lumped-element band-pass filter of the kind used in intermediate frequency amplifiers. Suitable filters are described in Radio Engineers Handbook by Frederick E. Terman, first edition, published in 1943 by the McGraw-Hill Book Co., New York city, New York, on pages 170 to 172. The difference frequency signal appearing at the output of the filter 19 is fed to an amplifier-limited 20 where it is amplified and amplitude limited to some predetermined value. Suitable amplifiers which may be used in the amplifier-limited 20 are described in the aforementioned Terman Handbook on pages 434 to 441. Suitable limiter circuits are described in the same Handbook on pages 668 to 670.

As indicated previously, the output frequency of the variable oscillator 14 is a function of the applied magnetic field to be measured, this magnetic field exerting its influence upon the ferrite body 17 contained in the second cavity resonator 16. Thus, any variations occurring in this magnetic field will correspondingly alter the frequency of the output signal from the variable oscillator 14. In order to detect these frequency variations, and thus develop a magnetic-field-representing output signal which varies in amplitude solely as a function of the frequency of the signal from a variable oscillator 14, the output from the amplifier-limited 20 is fed to a discriminator circuit 22. This discriminator circuit 22 may be any of the conventional discriminator circuits suitable for the reception of frequency modulated signals. Various types of discriminator circuits which may be used are described in the Terman Handbook referred to, on pages 585 to 588. The characteristics of the discriminator circuit 22 are illustrated in Fig. 2. As shown in this figure, the output of the discriminator circuit 22 is a direct current voltage which varies linearly (over a predetermined range) with the variation of the difference signal ($f_1-f_2$) from its resonance frequency $f_r$, the resonance frequency $f_r$ of the difference signal being defined as the difference signal representative of a zero environmental magnetic field.

The direct current output signal from the discriminator circuit 22 is fed to a direct current amplifier 24 to raise the signal to a suitable level for actuating an indicating or other utilization device 26. For example, where the magnetometer is used in a remote controlled vehicle the utilization device may be a telemetering transmitter.

Thus it is seen that, since the output from the discriminator circuit 22 is a signal which is a function of the difference between the frequency of the variable oscillator 14 and the frequency of the reference oscillator 10, with this difference frequency being a function of the applied magnetic field, the signal output from the discriminator circuit is a measure of the applied magnetic field.

Some of the circuits and components illustrated in Fig. 1 will now be discussed in greater detail. The oscillators 10 and 14 may comprise conventional microwave signal generators which, together with the resonant cavities or resonators 12 and 16, are suitably stabilized. For example reflex klystrons, such as those commonly referred to as the model X-13 klystron, made by Varian Associates of California, may be used.

An example of a ferrite loaded cavity resonator 16 which can be used in conjunction with the variable oscillator 14, to produce an output signal which varies as a function of the applied magnetic field, is illustrated in Figs. 3 and 4. The resonator 16 comprises a cylindrical cavity 28 defined by walls made of magnetically permeable material, such as fused quartz plated with platinum, and containing a cylindrical ferrite rod 30 mounted coaxially within the cavity. For convenience of explanation the ferrite rod 30 is illustrated as being unmagnetized (that is, having only a small residual permanent magnetization) and having a ferromagnetic resonance frequency in the neighborhood of the normal resonant frequency of its associated cavity. However, it is realized that if the ferrite rod exhibits its ferromagnetic resonance response in a frequency neighborhood different from that of the resonant frequency of its associated resonant cavity, the ferrite rod may be premagnetized. In such a case the premagnetization may be effected by having the ferrite rod permanently magnetized, or by subjecting the rod to a biasing magnetization, as by means of a suitable bias current, not shown. This premagnetization sets up a polarizing field in the ferrite rod so as to shift the frequency neighborhood of ferromagnetic resonance to that of the cavity.

Referring again to Figs. 3 and 4, the cavity 28 is coupled to four rectangular wave guides 32a, 32b, 32c, and 32d through respective wave guide apertures 34a, 34b, 34c, 34d, oriented 90 degrees apart so as to cause two orthogonal $TM_{110}$ modes to be excited within the cavity 28. One mode is excited by a first pair of oppositely oriented apertures 34a and 34c. The magnetic fields associated with this first mode are depicted by circular arrows 35a and 35c. The other mode, which is orthogonal to the first mode, is excited by the other pair of oppositely oriented apertures 34b and 34d. The magnetic fields associated with this other mode are indicated by circular arrows 35c and 35d. Two side wall couplers 36a and 36b divide the signal energy equally between, respectively, the wave guides 32a and 32b and wave guides 32c and 32d. Such couplers 36a and 36b are usually referred to as 3 decibel couplers. Matched loads 38a and 38b are positioned at the end portions of wave guides 32b and 32c. A similar construction can be used for the constant frequency reference resonator 12 (Fig. 1), except that the reference resonator would not contain a ferrite element.

In the operation of the resonator 16 (Fig. 3), microwave energy entering into the cavity 28 from the input end thereof (through the input wave guide 32a) is divided by the side wall coupler 36a associated with it so that one-half of the energy reaches the first cavity aperture 34a and the other half reaches the second cavity aperture 34b, with the signal arriving at the second aperture lagging that at the first aperture 34a by 90 electrical degrees in time. The magnetic fields within the four wave guides 32a to 32d and adjacent to the apertures are indicated by dashed line arrows 39a, 39b, 39c, and 39d. The magnetic fields of the signals adjacent to the apertures 34a and 34b are thus 90 degrees out of phase with each other, with the result that there is generated within the cavity 38 a rotating cavity mode in a counterclockwise direction (that is, counterclockwise with respect to the view of Fig. 4). At or near resonance, the energy in the cavity is coupled to the output wave guides 32c and 32d through apertures 34c and 34d, respectively. The signals appearing at the output apertures 34c and 34d are likewise 90 degrees out of time phase with each other. Thus, an addition of the signal energies occurs at the output end of the open ended output wave guide 32d whereas a signal cancellation takes place at the closed end of the other output wave guide 32c, that is, at the wave guide end terminated by the matched load 38b.

The presence of a component of magnetic field (such as an environmental field to be measured) in a direction along the longitudinal axis of the elongated ferrite rod 30 mounted in the center of the cavity 28 causes the signal energy in the cavity 28 to take the form of rotating field patterns with different resonant frequencies for positive and negative senses of rotation and for different strengths of magnetizing field applied to the ferrite rod 30. Input signal energy, entering the cavity 28 by way of the open-ended input wave guide 32a, will tend to couple into a clockwise rotating mode within the cavity, corresponding to positive circular polarization. With the magnetic field applied in the direction shown in Fig. 3 (in a direction up and out of the plane of the drawing of Fig. 4) the non-reciprocal character of the ferrite rod 30 makes any increase in the magnitude of the applied magnetic field tend to increase the resonant frequency of the cavity 28.

Fig. 5 illustrates a typical curve 41 of resonant cavity frequency shift, due to the ferrite rod 30 in the example of Figs. 3 and 4, in the presence of different values of applied D.C. magnetic field. The ferrite rod 30 in the example is ⅛ inch in diameter, 1.6 inches in length, and extends beyond each of the end walls defining the cavity 28. The cavity 28 is 1.59 inches in diameter by 0.69 inch in length and the apertures (34a to 34d) are .30 inch in diameter. A central resonant frequency $f_0$ of 8980 megacycles per second, of the variable frequency cavity 28, corresponds to that frequency at which there is zero applied magnetic field. The curve 41 shows the resonant frequency shift from $f_0$ for various values of applied D.C. magnetic field, both for the case of positive circular polarization and of negative circular polarization. Since (as shown in Fig. 5) the change in frequency with change in magnetic field strength changes from an essentially linear to a nonlinear relationship with magnetic field strength of relatively large magnitudes, the optimum operating region is preferably within the linear change region, else the nonlinear response must be compensated for. Since the greatest linearity, as well as greatest frequency change per unit magnetic field strength change, lies in the region of relatively low magnetic field strengths, the arrangement of the invention proves especially advantageous in the measurement of such low field strengths.

Referring again to Fig. 5, it can be seen that for both negative and positive circular polarization a change in applied magnetic field in the neighborhood of about 50 gauss will produce a change in resonant frequency of about 70 megacycles from a zero magnetic field frequency of 8980 megacycles per second. In other words, for the apparatus used in providing the example depicted in Fig. 5, there is a frequency change of about 1.4 cycles per second per microgauss. Since changes in frequency of appreciably less than 100 cycles in 40 megacycles can be readily detected by available discriminator circuits, a sensitivity of the order of 100 microgauss or better can be easily realized. In order to exceed this sensitivity, it may be desirable to provide some means for stabilizing the temperatures of the two cavities, so as to avoid frequency drift of the cavities. One means of realizing temperature stabilization, for example, may include a container within which the two cavities are maintained in mutual thermal contact so that any variation in ambient temperature will cause both cavities to change temperature by equal amounts. Since the output frequencies of both oscillators 10 and 14 will change equally in the same direction, the frequency difference between the two oscillators will remain substantially constant. While the reference oscillator 10 has been described as being of the same general type as that of the variable oscillator 12, in order that the two oscillators exhibit similar inherent frequency drift tendencies so that the drift of one will tend to cancel that of the other, it is realized that the oscillators may be of different types. For example, the reference oscillator 10 may take the form of a very stable oscillator of the atomic clock variety. This type of oscillator may be of the kind that makes use of the atomic resonance of an alkaline metal, such as rubidium, as a frequency standard. Atomic clocks are discussed, for example, in three articles by M. Arditi and T. R. Carver, A. O. McCoubrey, and W. Mainburger and A. Orenberg, respectively, in the 1958 IRE National Convention Record, part I, pages 3 to 18. Such atomic clock oscillators are capable of stabilities of the order of 5 parts in $10^{10}$.

While one form of ferrite loaded cavity resonator has been described, it will be understood that other types of ferrite loaded resonators can be used in place of the one depicted. For example, other suitable resonators are disclosed in an article entitled "Ferrite Tunable Microwave Cavities and the Introduction of a New Reflectionless, Tunable Microwave Filter," by Conrad E. Nelson in the Proceedings of the IRE, vol. 44, No. 10, October 1956, on pages 1449–1455.

The magnetic field measurement method above described is predicated upon detecting a change in frequency in a ferrite element loaded cavity resonator brought about by the action of the magnetic field on the ferrite element. Consequently, it is important to assure that any changes in resonator frequency are brought about solely by changes in the magnetic field and not by frequency drift of the resonators. While temperature compensation may be effective to minimize frequency drift due to thermal effects, it will not eliminate other sources of drift, such as may be brought about by changes in size and shape of the resonator walls due to the subjection of the resonators to extreme variations in vibration or other mechanical shock. Furthermore, the two resonators 12 and 16 may not drift at the same rate over a long period of time. For example, referring to the graph of Fig. 6, the frequency drift of the first resonator 12, indicated by the solid line curve A, may be different from that of the ferrite loaded resonator 16, represented by the broken line curve B.

In accordance with the invention, the undesirable effects of frequency drift in the resonators 12 and 16, from whatever source it originates, may be substantially eliminated by periodically varying the relative orientation between the ferrite element and the direction of the magnetic field component to be measured. In accordance with one arrangement, illustrated schematically in Fig. 7, the ferrite loaded cavity resonator 16 is physically rotated at some convenient rate so as to periodically change the orientation of the ferrite with respect to the component of the environmental magnetic field to be measured.

According to the invention, and as shown schematically in Fig. 7, the second or variable frequency resonator 16 (containing the elongated ferrite body 30) is mounted for rotational movement about an axis O—O' which is perpendicular to the long axis of the ferrite body. In this example the component of the magnetic field to be measured is in a plane perpendicular to the axis of rotation. The total field measured will in fact be a vector summation of two perpendicular components lying in that plane. Means for separating these two components are described later herein. A motor 39 and pulley arrangement 40 may be used to effect rotation of the resonator 16 so that at one instant of time the ferrite body is aligned in one sense with respect to the magnetic field to be measured, while at an instant of time one-half rotational cycle later the ferrite body is aligned in a sense opposite that of the first sense. The resonant frequency of the cavity follows the variation in orientation of the ferrite body—that is, the resonant frequency of the cavity is higher during one orientation of the ferrite body than during an opposite orientation. Thus, if the cavity containing the ferrite body is spinning with respect to the magnetic field, the resonant frequency of the cavity will be modulated sinusoidally at the spin rate to produce a frequency deviation whose extent is directly proportional to the magnitude of the magnetic field. Consequently, the magnitude of the component of the magnetic field being measured can be inferred directly from the extent of frequency excursion. The fact that the resonant frequency of the cavity is also slowly drifting, as by reason of a change in temperature, does not interfere with the measurement made by this method. The sinusoidal variations in resonant frequency of the resonator 16 due to its rotation (say at 3 cycles per second) may be relatively low as long as these variations are large as compared to the rate of drift of the resonant frequency.

As illustrated in Fig. 8, the variations in resonator frequency due to rotation is represented by curve C, while the frequency drift is represented by curve B. The extent of the frequency variation, determined by the strength of the magnetic field, is denoted by $\Delta f$.

An indication of the magnetic field sensed by the spinning resonator arrangement is provided by the processing circuit schematically illustrated in block form in Fig. 9. The arrangement of Fig. 9 is generally similar to that of Fig. 1. The rotating resonator feeds a sinusoidally changing input signal $f_2'$ into the mixer 18, the constant frequency resonator feeding a constant frequency $f_1'$ into the mixer 18. The mixer 18 will now produce an output difference signal having a constant or carrier frequency component $f_r$ (corresponding to the frequency that would be produced in the absence of any environmental magnetic field) and a modulating component $\Delta f$ corresponding to the sinusoidal frequency variation. (The output signal from the mixer 18 is passed through a bandpass filter 19 to remove extraneous frequency components.) The mixer output signal is then fed into an amplifier-limiter 20, as explained before with respect to Fig. 1, and then to a discriminator circuit 22. The output signal from the discriminator circuit 22 will not be a constant voltage independent of time, as was the case in the example of Fig. 1, but will instead be a unidirectional or direct current signal having a constant voltage level component (corresponding to the voltage level that would be present in the absence of any environmental magnetic field) and a super-imposed sinusoidally varying (or low frequency alternating current) component; the period of the sinusoidal voltage variation is the same as that of the spinning resonator, and the amplitude of the sinusoidal component is proportional to the magnitude of the environmental magnetic field component lying in the plane in which rotation of the ferrite is effected. The alternating current component is then separated from the direct current component, for example, by feeding the output from the discriminator circuit 22 through an amplifier 24 to a band-pass filter 25 tuned to the frequency range of the sinusoidal variation.

If desired, instead of physically rotating the ferrite loaded cavity resonator 16 to effect a change in the relative angular orientation of the ferrite with respect to the magnetic field being measured, comparable examination of the magnetic field can be produced by an "electronic" rotation, as will be explained. In this electronic rotation a plurality of elongated ferrite elements (not shown), each within its own resonant cavity, may be arranged in side-by-side adjacency, with each successive ferrite element aligned in a successively different angular direction. The ferrite elements are oriented to lie in mutually parallel planes, so that the elements collectively are capable of sensing the magnetic field in different angular directions in an essentially common plane. By electronically switching the successive ferrite loaded cavities (as by any of the well-known multiplexing arrangements) so that the outputs from the variable oscillator or oscillators associated with them are successively compared or mixed with the output from the reference oscillator, the magnetic field component in the essentially common plane is mapped out by the quantized sinusoidal output depicted in Fig. 10. Thus, the cavities associated with the differently oriented ferrite elements can be connected to provide what is an effective successive rotation of the elements, and thereby effect electronically what has been described in Figs. 7 and 8 as done by mechanical means.

Thus, according to this electronic rotation arrangement, the switched ferrite loaded cavities will feed into the mixer 18 (Fig. 9) the carrier frequency component $f_1'$ plus the superimposed modulating component $f_2'$ in a similar manner as in the case of the spinning cavity described above. In this case however, the superimposed modulating component $f_2'$ will be a discontinuous or step function, D, as shown in Fig. 10, instead of a continuous sinusoidal function as indicated by curve C in Fig. 8. The number of discrete steps $a$ through $j$ in one complete cycle or effective rotation will be equal to the number of ferrite loaded cavities used. In the illustration of Fig. 10 the output function D is depicted as derived from electronic rotation apparatus having ten ferrite elements.

In such an arrangement it is preferred to have all of the ferrite loaded cavities in close thermal contact so as to minimize the effective drift rates between these cavities. The ferrite loaded cavities should preferably be of the same variety. For example, they should be made of the same material and they should be dimensioned in the same relative proportions. However, any substantial differences in the characteristics or dimensions of the cavities and ferrites can be determined and the known differences can be taken into account in the measurements.

The magnetic field measuring apparatus of the invention described in Figs. 7 to 9 is adapted to measure the magnitude of the component of a magnetic field lying in a plane perpendicular to the axis of rotation of the ferrite element. The apparatus of the invention may also be used to measure the three orthogonal components of a given magnetic field, and hence obtain the resultant field. The apparatus shown in Fig. 11 may be used for this purpose. Briefly, use is made of three ferrite loaded cavities which are rotated in three mutually perpendicular planes in space. The three variable signal frequencies, each associated with a ferrite loaded cavity, are each separately heterodyned with the signal from a reference oscillator to produce three difference signals. Each of the difference signals varies in frequency in accordance with the measured variation of the component of magnetic field associated with it. The three difference signals are then passed through appropriate circuits to produce three output signals which have amplitudes representative of the magnitudes of the respective components of magnetic field to be measured.

Apparatus for measuring the magnetic field components in three mutually perpendicular directions will now be described. Referring to Fig. 11, the constant frequency signal output of a constant frequency reference oscillator 41 is channeled into each of three mixers 44a, 44b, and 44c. This may be realized, for example, by successively channeling the signals into the mixers 44a to 44c by means of a multiplexer 42. The output signals of three variable frequency oscillators 46a, 46b, and 46c, are also fed to the mixers 44a, 44b, and 44c, respectively. The signal frequencies of these oscillators 46a, 46b, and 46c are variable in accordance with the strength of the environmental magnetic field applied to three ferrite bodies 48a, 48b, and 48c, one body being associated with each oscillator. The ferrite bodies 48a, 48b, and 48c are each mounted within an associated cavity resonator 50a, 50b, and 50c, respectively, with the cavities being mounted so as to be rotatable in three mutually perpendicular planes. One cavity 50a is rotatable in an $x$—$y$ plane parallel to the plane of the drawing. The second cavity 50b is rotatable in a $y$—$z$ plane extending horizontally with respect to the view of Fig. 11, and in a plane normal to that of the drawing. The third cavity 50c is rotatable in an $x$—$z$ plane extending in directions normal to the plane of the drawing. Cavity rotation means 60 are coupled to each of the cavities 50a, 50b, and 50c to effect these rotations. In the interest of simplicity of explanation, the coupling between the rotation means 60 and the cavities 50a, 50b, and 50c is indicated by lines 61.

As indicated above, the three cavities 50a, 50b, and 50c, and their associated ferrite bodies 48a, 48b, and 48c, are rotated in three mutually perpendicular planes. Consequently, the frequencies of the difference signal outputs of the mixers 44a, 44b, and 44c collectively can be used to provide any desired information relative to the magnitudes of the magnetic field components in the region of the apparatus. The processing of the difference frequency signals may be realized in a manner similar to that described above in connection with Figs. 7 to 9, with each of the difference signals being successively subjected to band-pass filters 51a, 51b, and 51c, amplifier-limiters 52a, 52b, and 52c, discriminators 54a, 54b, and 54c, amplifiers 56a, 56b, and 56c, and band-pass filters 58a, 58b, and 58c, to produce three signals from the outputs of the filters 58a, 58b, and 58c. The outputs represent, respectively, the three components of the environmental magnetic fields lying in the three mutually perpendicular planes through which cavity rotation is effected.

As described, each of the rotating cavities 50a, 50b, and 50c operates to measure the component of magnetic field in the given plane through which the respective cavity rotates. The magnetic field component that is measured at any instant of time is in fact a resultant of the two vector components which extend in two coordinate directions in that given plane of rotation. For instance, the instantaneous measurement of the magnetic field in any direction in the $x$—$y$ plane (in which the first cavity 50a is rotated) is made up of an $x$ component and a $y$ component. Similarly, the instantaneous measurement in the $y$—$z$ plane (associated with the second cavity 50b) is made up of $y$ and $z$ components, and the instantaneous measurement in the $x$—$z$ plane (associated with the third cavity 50c) is made up of $x$ and $z$ components. In order to determine the separate values of the $x$, $y$, and $z$ components from these measurements, the following arrangement may be used. The angular position of each ferrite body 48a, 48b, and 48c is monitored as the cavities are rotated (as by the direction sensing means 62 shown schematically as connected to the cavity rotation means 60), and each of the sinusoidal signal outputs (from the band-pass filters 58a, 58b, and 58c) are sampled when the ferrite bodies are aligned in the angular position corresponding to the direction of a desired respective one of the three $x$, $y$, and $z$ magnetic field components to be measured. Since each cavity 50a, 50b, and 50c successively measures the field components in two directions, only two cavities are really needed to obtain measurements of the three magnetic field components. However, three cavities are illustrated for purposes of explanation.

As shown in Fig. 11, the direction sensor 62 is coupled to the cavity rotation means 60 to monitor the position of each of the ferrite bodies 48a, 48b, and 48c. Sample and hold circuits 64a, 64b, and 64c are provided, one for each magnetic field component to be measured. Each sample and hold circuit is connected between the direction sensor 62 and the output circuit of a band-pass filter 58a, 58b, or 58c. Each sample and hold circuit samples an output signal at the time when the associated ferrite body is oriented in the direction of the field component to be measured, and holds a signal representative of the sampled component until a later time when this component is to be compared with an oppositely oriented component. Since sample and hold circuits are well known in the art, and any of the usual varieties may be used, the details of such circuits will not be further discussed.

Figure 12:
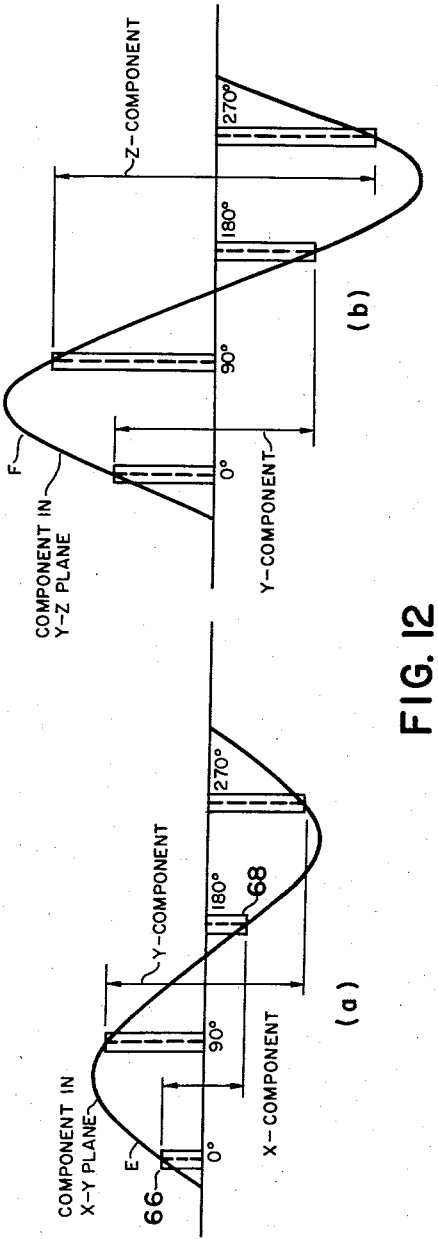
Fig. 12 is a graph of changes in magnetic field strength with changes in direction, and useful in explaining the operation of the apparatus shown in Fig. 11.

To illustrate the operation of the direction sensing and sampling circuits, reference is made to the graphs a and b of Fig. 12 which show graphs of typical sinusoidal wave forms at the inputs to the sample and hold circuits 64a and 64b (Fig. 11) associated with the first two cavities 50a and 50b. The wave form E represents the signal appearing at the output of the band-pass filter 58a associated with the x—y plane, and the wave form F represents the signal associated with the second band-pass filter 58b and the y—z plane. Referring first only to the signal in the x—y plane (wave form E), the magnitude of the x component present in the signal may be determined by sampling the wave form at times (as determined by the direction sensor 62 of Fig. 11) when the ferrite body 48a is aligned successively in one direction and then in the opposite direction. These times will occur for example at 0 degrees, 180 degrees, 360 degrees, and so on, as shown in the graph of Fig. 12a. The associated sample and hold circuit 64a samples the signal at each of these times and, either through the use of a separate signal comparison circuit (not shown) or a signal comparison circuit integral with the sample and hold circuit, compares each sampled signal 66 with the successive sampled signal 68 (which is representative of the magnetic field in a direction opposite that represented by the first sampled signal 66) to determine the difference between them. This difference, as has been explained above, is a measure of the magnetic field component in a line defined by the sampled opposite directions. (The y component of the magnetic field can be obtained from the output derived from the same first ferrite body 48a by connecting a second sample and hold circuit, not shown, to sample, hold, and compare signals received during the 90 and 270 degree points.) As indicated by the graph line F of Fig. 12b, the second ferrite body 50b can be used to derive the value of the y and z components in a manner analogous to that described. Since the x, y, and z components can be derived through the use of two rotating ferrite bodies, the third body 48c and its associated circuitry may be dispensed with for the present purpose.

A further advantage may be realized in the operation depicted in Figs. 12a and 12b. Since two separate circuits independently measure the magnitude of the same component, the y component, these separately measured values of the y component may be compared—they should be the same. If they are not the same, their difference is a measure of magnitude of error. In such a case, while it is not known which of the two measurements are in error (or whether both are in error), the error signal may be used to operate an automatic gain control circuit (not shown) so as to assure that the indicated measurements are accurate in so far as they are relative to each other.

From the foregoing it is seen that the novel and improved magnetic field responsive apparatus of the invention is useful in measuring the magnitudes of relatively low magnetic fields, may also be applied to other apparatus whose operation is predicated upon response to magnetic field variations but which are designed for other than measuring purposes, and is particularly useful in providing accurate and reliable measurements of weak magnetic fields under conditions of changing environmental influences non-magnetic in nature.

What is claimed is:

1. Apparatus for measuring environmental magnetic fields, comprising: a first source of microwave signal energy connected to provide a first microwave signal output; a second source of microwave signal energy connected to provide a second microwave signal output; a ferrite loaded resonant cavity magnetic field responsive means coupled to said second source to change the frequency of the output signal of said second source in response to variations in environmental magnetic field applied to said magnetic field responsive means; said magnetic field responsive means being mounted to successively sense each of a series of environmental magnetic field components having successive different angular orientations and lying generally in a common plane, thereby to provide a modulation of the frequency of the output signal of said second source for minimizing the effect of frequency change due to signal source drift; and means coupled to said first and second sources to compare the frequencies of said first and second microwave signal outputs and to produce a resultant signal which is a function of the magnitude of the environmental magnetic field applied to said magnetic field responsive means.

2. Apparatus for measuring environmental magnetic fields, comprising: a first source of microwave signal energy connected to provide a first microwave signal output; a second source of microwave signal energy connected to provide a second microwave signal output; magnetic field responsive means coupled to said second source to change the frequency of the output signal of said second source in response to variations in environmental magnetic field applied to said magnetic field responsive means; said magnetic field responsive means being mounted to successively sense each of a seris of environmental magnetic field components having successive different angular orientations and lying generally in a common plane, thereby to provide a modulation of the frequency of the output signal of said second source for minimizing the effect of frequency change due to signal source drift; and means coupled to said first and second sources to compare the frequencies of said first and second microwave signal outputs and to produce a resultant signal which is a function of the magnitude of the environmental magnetic field applied to said magnetic field responsive means.

3. The apparatus claimed in claim 2, wherein said magnetic field responsive means is mounted for rotational movement.

4. Apparatus for measuring environmental magnetic fields, comprising: a first source of microwave signal energy connected to provide a first microwave signal output; a second source of microwave signal energy connected to provide a second microwave signal output; magnetic field responsive means coupled to said second source to change the frequency of the output signal of said second source in response to variation in environmental magnetic field applied to said magnetic field responsive means; said magnetic field responsive means being mounted to successively sense each of a series of environmental magnetic field components having successive opposite orientations, thereby to provide a modulation of the frequency of the output signal of said second source for minimizing the effect of frequency change due to signal source drift; and means coupled to said first and second sources to compare the frequencies of said first and second microwave signal outputs produced during each of said orientations of said magnetic field responsive means and to produce a resultant signal which is a function of the magnitude of the environmental magnetic field applied to said magnetic field responsive means.

5. Apparatus for measuring environmental magnetic fields, comprising: a first source of microwave signal energy connected to provide a first microwave signal output; a second source of microwave signal energy connected to provide a second microwave signal output; magnetic field responsive means coupled to said second source to change the frequency of the output signal of said second source in response to variations in environmental magnetic field applied to said magnetic field responsive means; said magnetic field responsive means being mounted to successively sense each of a series of environmental magnetic field components having successive opposite orientations; comparing means coupled to said first and second sources to compare the frequencies of said first and second microwave signal outputs produced during each of said orientations of said magnetic field responsive means to produce a resultant signal which is a function of the magnitude of the environmental magnetic field applied to said magnetic field responsive means during the orientation, and to compare successive resultant signals to derive an output signal representative of the maximum frequency excursion of said second source during successive opposite orientations of said magnetic field responsive means, whereby said derived output signal is representative of the magnetic field in the directions of said successive opposite orientations.

6. Apparatus for measuring environmental magnetic fields, comprising: a first source of microwave signal energy connected to provide a first microwave signal output; a second source of microwave signal energy connected to provide a second microwave signal output; a ferrite loaded resonant cavity magnetic field responsive means coupled to said second source to change the frequency of the output signal of said second source in response to variations in environmental magnetic field applied to said magnetic field responsive means; said magnetic field responsive means being mounted for rotation to successively sense each of a series of environmental magnetic field components having successive opposite orientations; comparing means coupled to said first and second sources to compare the frequencies of said first and second microwave signal outputs produced during each of said orientations of said magnetic field responsive means to produce a resultant signal which is a function of the magnitude of the environmental magnetic field applied to said magnetic field responsive means during the orientation, and to compare successive resultant signals to derive an output signal representative of the maximum frequency excursion of said second source during successive opposite orientations of said magnetic field responsive means, whereby said derived output signal is representative of the magnetic field in the directions of said successive opposite orientations.

7. The apparatus claimed in claim 6, wherein said comparing means includes sample and hold means connected to sample a signal representative of the magnitude of the magnetic field in one of said orientations, and to provide an indication of said representative signal during the processing of a signal representative of the magnitude of the magnetic field in the next successive one of said orientations, whereby said last named representative signals may be compared to provide a frequency-drift-free indication of the magnetic field magnitude in said successive orientations.

8. Apparatus for measuring environmental magnetic fields, comprising: a first source of microwave signal energy connected to provide a first microwave signal output; a second source of microwave signal energy connected to provide a second microwave signal output; magnetic field responsive means coupled to said second source to change the frequency of the output signal of said second source in response to variations in environmental magnetic field applied to said magnetic field responsive means; said magnetic field responsive means being mounted to successively sense each of a series of environmental magnetic field components having successive different angular orientations and lying generally in a common plane, thereby to provide a modulation of the frequency of the output signal of said second source for minimizing the effect of frequency change due to signal source drift; frequency comparing means coupled to said first and second sources to compare the frequencies of said first and second microwave signal outputs and to produce a resultant signal which is a function of the magnitude of the environmental magnetic field applied to said magnetic field responsive means; and signal sampling means coupled to said magnetic field responsive means and to said frequency comparing means to sample the output of said frequency comparing means at times corresponding to the times of sensing of the magnitude of the environmental magnetic field in two opposing directions so as to provide an output signal representative of the magnitude of a magnetic field component in said directions.

9. Apparatus for measuring environmental magnetic fields, comprising: a first source of microwave signal energy connected to provide a first microwave signal output; a second source of microwave signal energy connected to provide a second microwave signal output; magnetic field responsive means coupled to said second source to change the frequency of the output signal of said second source in response to variations in environmental magnetic field applied to said magnetic field responsive means; said magnetic field responsive means being mounted to successively sense each of a series of environmental magnetic field components having successive different angular orientations and lying generally in a common plane, thereby to provide a modulation of the frequency of the output signal of said second source for minimizing the effect of frequency change due to signal source drift; frequency comparing means coupled to said first and second sources to compare the frequencies of said first and second microwave signal outputs and to produce a resultant signal which is a function of the magnitude of the environmental magnetic field applied to said magnetic field responsive means; direction sensor means coupled to said magnetic field responsive means to monitor the orientation thereof, thereby to monitor the magnetic field components being sensed; and sample and hold circuit means coupled to said direction sensor means and to said frequency comparing means to sample the output of said frequency comparing means at predetermined times corresponding to the times of orientation of said magnetic field responsive means in certain predetermined directions, and to compare the sampled signal with another signal sampled from the output of said frequency comparing means at times corresponding to times of orientation of said magnetic field responsive means in directions opposite said predetermined directions.

10. Apparatus for measuring environmental magnetic fields, comprising: a first resonant cavity controlled source of microwave signal energy connected to provide a first microwave signal output; a second resonant cavity controlled source of microwave signal energy connected to provide a second microwave signal output; magnetic field responsive means coupled to said second source to change the frequency of the output signal of said second source in response to variations in environmental magnetic field applied to said magnetic field responsive means; said magnetic field responsive means including a ferrite element that exhibits a change in ferromagnetic resonance characteristic on experiencing a change in environmental magnetic field in predetermined directions, said element being mounted for effective rotational movement to successively sense each of a series of environmental magnetic field components having successive different angular orientations and lying generally in a common plane, with said element being positioned with respect to the resonant cavity of said second source to influence the resonant frequency thereof as a function of the magnitude of the magnetic field applied to said element in said predetermined direction, thereby to provide a modulation of the frequency of the output signal of said second source for minimizing the effect of frequency change due to signal source drift; and means coupled to said first and second sources to compare the frequencies of said first and second microwave signal outputs and to produce a resultant signal which is a function of the magnitude of the environmental magnetic field applied to said magnetic field responsive means.

11. The apparatus claimed in claim 10, wherein said ferrite element is fixed with respect to said second cavity, and said ferrite element and said second cavity are mounted for mechanical rotational movement.

12. Apparatus for measuring environmental magnetic fields, comprising: a first source of microwave signal energy connected to provide a first microwave signal output; a second source of microwave signal energy connected to provide a second microwave signal output; magnetic field responsive means coupled to said second source to change the frequency of the output signal of said second source in response to variations in environmental magnetic field applied to said magnetic field responsive means; said magnetic field responsive means being mounted to successively sense each of a series of environmental magnetic field components having successive different angular orientations and lying generally in a common plane, thereby to provide a modulation of the frequency of the output signal of said second source for minimizing the effect of frequency change due to signal source drift; and means coupled to said first and second sources to compare the frequencies of said first and second microwave signal outputs and to produce a resultant signal which is a function of the magnitude of the environmental magnetic field applied to said magnetic field responsive means; said magnetic field responsive means including at least one microwave cavity resonant to one frequency in the absence of an environmental magnetic field, and resonant to a frequency different from that of said one frequency in the presence of said environmental magnetic field.

13. Environmental magnetic field measuring apparatus of the kind adapted to measure the magnitude of magnetic field components in three mutually perpendicular directions, comprising: two resonant cavity controlled oscillator microwave signal generator means each adapted to generate microwave signal energy, a first of said generator means including at least two variable frequency resonant cavity controlled oscillators each adapted to generate signal energy at a frequency substantially within the frequency range within which a ferromagnetic material is capable of exhibiting ferromagnetic resonance; each of said variable frequency oscillators being associated with a cavity mounted to successively sense each of a series of environmental magnetic field components having successive different angular orientations and lying generally in a common plane, perpendicular to the plane sensed by the cavity of the other of said oscillators, and with each cavity of said variable frequency oscillators connected to determine the output frequency of the signal generated by its associated oscillator; each of said cavities including a ferromagnetic material of a type having a ferromagnetic resonance frequency substantially adjacent to the resonant frequency of its associated cavity in the absence of an environmental magnetic field, with the ferromagnetic material of each cavity being positioned to change the resonant frequency of its associated cavity in response to the subjection of the ferromagnetic material to the associated components of the environmental magnetic field to be sensed; whereby each of said variable frequency oscillators is adapted to produce an output signal whose frequency is influenced by the subjection of its associated ferromagnetic material to the environmental magnetic field; the other microwave generator means including a reference frequency resonant cavity controlled oscillator associated with a cavity that is substantially free of ferromagnetic material exhibiting said ferromagnetic resonance property; frequency comparing means connected to receive the output signals from both of said microwave generator means and to produce at least two resultant signals each representative of the change in output signal frequency of a respective one of said variable frequency oscillators; direction sensor means coupled to each of the cavities associated with said variable frequency oscillators to monitor the orientation thereof, thereby to monitor the magnetic field components being sensed thereby; and sample and hold circuit means coupled to said direction sensor means and to said frequency comparing means to sample a first signal from each of the outputs of said frequency comparing means at predetermined times of orientation of respective ones of said variable frequency oscillator cavities in certain predetermined directions, and to compare each of said first sampled signals with a second signal sampled from the same output from which each of said first signals is sampled, with said sample and hold circuit means connected to provide said second sampled signals at times of orientation of the respective cavity in directions opposite said predetermined directions.

References Cited in the file of this patent

UNITED STATES PATENTS

| | | |
|---|---|---|
| 2,597,149 | Kahan | May 20, 1952 |
| 2,671,884 | Zaleski | Mar. 9, 1954 |
| 2,709,783 | Hare | May 31, 1955 |
| 2,766,426 | Wilhelm | Oct. 9, 1956 |

OTHER REFERENCES

Tuller, Galloway, and Zaffarano: Proceedings of the I.R.E., June 1948, pages 794–800.

Crain: Proceedings of the I.R.E., October 1955, pages 1405–1411.

Nelson: Proceedings of the I.R.E., October 1956, pages 1449–1455.

W. L. Whirry & C. E. Nelson: I.R.E. Transactions on Microwave Theory and Techniques, vol. MTT-6, No. 1, January 1958, pgs. 59–65.